United States Patent [19]

Miller

[11] Patent Number: 4,686,503

[45] Date of Patent: Aug. 11, 1987

[54] METHOD FOR RETROFITTING AUTOMOBILES WITH DECELERATION WARNING LIGHT

[76] Inventor: Terry G. Miller, 1005 LaVilla Rd., Punta Gorda, Fla. 33950

[21] Appl. No.: 809,477

[22] Filed: Dec. 16, 1985

[51] Int. Cl.[4] .............................................. B60Q 1/26
[52] U.S. Cl. ...................................... 340/71; 340/87; 362/80; 200/61.89
[58] Field of Search .................... 206/573; 340/71, 72, 340/66, 87, 97; 200/61.89; 362/61, 80

[56] References Cited

U.S. PATENT DOCUMENTS

| | | | |
|---|---|---|---|
| 2,853,572 | 9/1958 | Breeze | 200/61.89 |
| 3,105,884 | 10/1963 | Cottrell | 200/61.89 |
| 3,320,586 | 5/1967 | Wagner | 340/66 |
| 3,823,284 | 7/1974 | Hoffman | 200/61.89 |
| 4,173,012 | 10/1979 | Burger | 340/71 |
| 4,297,550 | 10/1981 | Leighton | 200/61.89 |
| 4,463,411 | 7/1984 | Proctor | 340/87 X |
| 4,575,782 | 3/1986 | Levine et al. | 340/87 X |
| 4,602,320 | 7/1986 | Tomkin et al. | 362/80 |

FOREIGN PATENT DOCUMENTS

| | | | |
|---|---|---|---|
| 3026674 | 2/1982 | Fed. Rep. of Germany | 340/71 |
| 2028024 | 2/1980 | United Kingdom | 340/71 |

Primary Examiner—James L. Rowland
Assistant Examiner—Brian R. Tumm

[57] ABSTRACT

A kit for retrofitting automobiles, primarily standard passenger cars, with a rear deck warning light to warn the drivers of following vehicles of the removal of the driver's foot from the accelerator pedal is disclosed. The kit includes a self-adhesive rear deck lamp housing; a length of double wire cable that may be fed through the body of the car to the trunk and attached to leads from the lamp housing; an adjustable switch bracket for mounting to the depending pivot bracket of an accelerator pedal pivoting linkage; a switch mounted on the bracket and wiring leads for connection to the cable; a device for tapping into a source of voltage at the fuse box of the vehicle; and a self-adhering miniature lamp electrically connected to the switch by a self-adhering flat ribbon cable. When the kit is properly installed, the removal of the driver's foot from the accelerator pedal closes the switch and lights the rear deck lamp and the miniature lamp which is secured to the outside surface of the dashboard within easy view of the driver.

2 Claims, 5 Drawing Figures

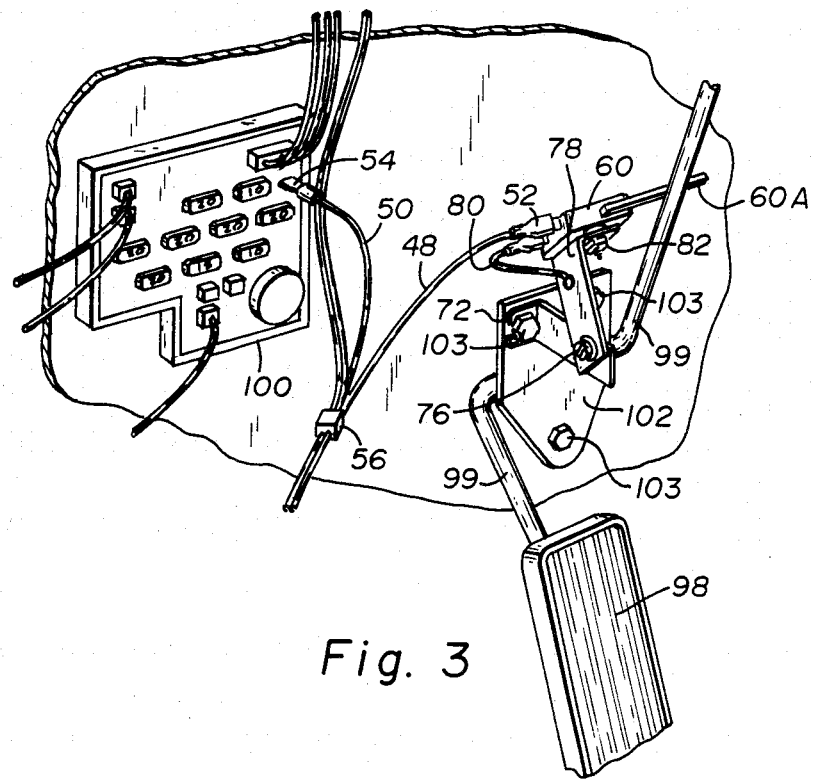
Fig. 3
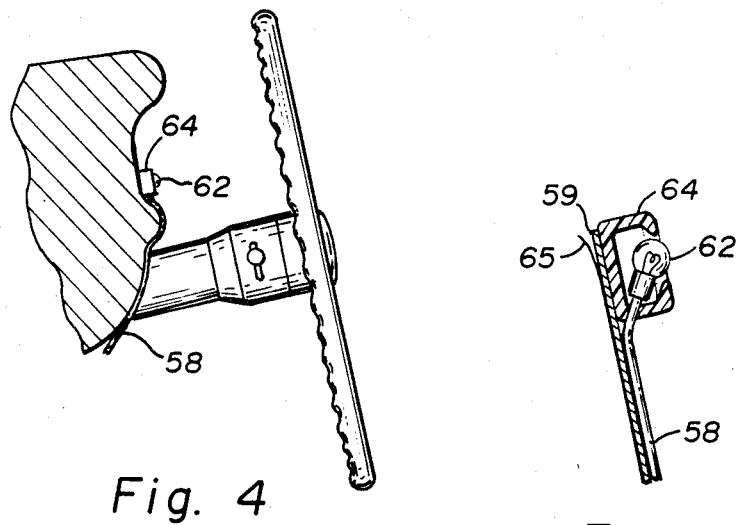
Fig. 4
Fig. 5

METHOD FOR RETROFITTING AUTOMOBILES WITH DECELERATION WARNING LIGHT

FIELD OF THE INVENTION

The present invention is directed toward a new and improved kit for retrofitting an automobile with a deceleration warning light.

BACKGROUND OF THE INVENTION

A number of proposals for manufacturing vehicles with deceleration warning systems have been proposed in the past. These include U.S. Pat. Nos.: 3,320,586 issued on May 16, 1967 to T. Wagner; 3,336,450 issued on Aug. 15, 1967, to P. Rainer; 3,414,879 issued on Dec. 3, 1968, to J. R. Holland; 3,501,742 issued on Mar. 17, 1970, to L. E. Ellison; 3,806,870 issued on Apr. 23, 1974, to E. A. Kalajian; 3,921,750 issued on Nov. 25, 1975, to M. Shames; 4,149,141 issued on Apr. 15, 1979, to K. Tanimura.

Such systems, however, require extensive modification of the conventional automobile and are difficult to retrofit into existing cars.

One system, that of U.S. Pat. No. 4,224,598, issued on Sept. 23, 1980, to Ostrowski, has specifically addressed the problem of retrofitting such a system into a vehicle, but even it requires addition of three switches and revising wiring under the hood.

Thus, all known prior decelerator signal systems must be either factory installed or installed by an electrician or mechanic and are not easily installed by the average driver.

SUMMARY OF THE INVENTION

In overcoming one or more of the problems of the prior art, the present invention provides a kit that is easy to use, requires no underhood modifications to the vehicle, and can be easily installed with a minimum use of tools such that the average driver can retrofit his or her car using the kit.

Such a kit constructed in accordance with the present invention comprises a lamp housing and electric light bulb unit equipped with an amber lens. The housing is adapted for mounting at the rear of an automobile, so that the light bulb could, when energized, emit light through the lens, to be seen as an amber warning light. The bulb is energized by the application of electric power between electric leads.

The kit also includes a length of cable of sufficient length to run a circuitous path between the area of the accelerator pedal to the area of the housing and be attached to the leads.

A small switch bracket unit including a bracket for mounting to the pedal bracket is also provided. The unit includes a switch mounted on the switch bracket, so arranged that it may be positioned and adjusted near the automobile accelerator pedal, to have the switch be activated upon release of the driver's foot from the accelerator pedal, and the kit also including means for connecting the cable to the fuse box of the automobile.

The invention, together with the advantages thereof, may best be understood by reference to the following description taken in connection with the accompanying drawings, in the several figures of which, like reference numerals identify like elements.

BRIEF DESCRIPTION OF THE DRAWINGS

FIG. 3 is a perspective view of a portion of the vehicle of FIG. 2 illustrating the manner of installing some of the parts of the kit.

FIG. 4 is a side view, partly in section, of a portion of a vehicle of FIGS. 2 and 3, showing the manner of installing another part of the kit.

FIG. 5 is a sectional view of one part of the kit.

DETAILED DESCRIPTION OF PREFERRED EMBODIMENT

Figure 1:
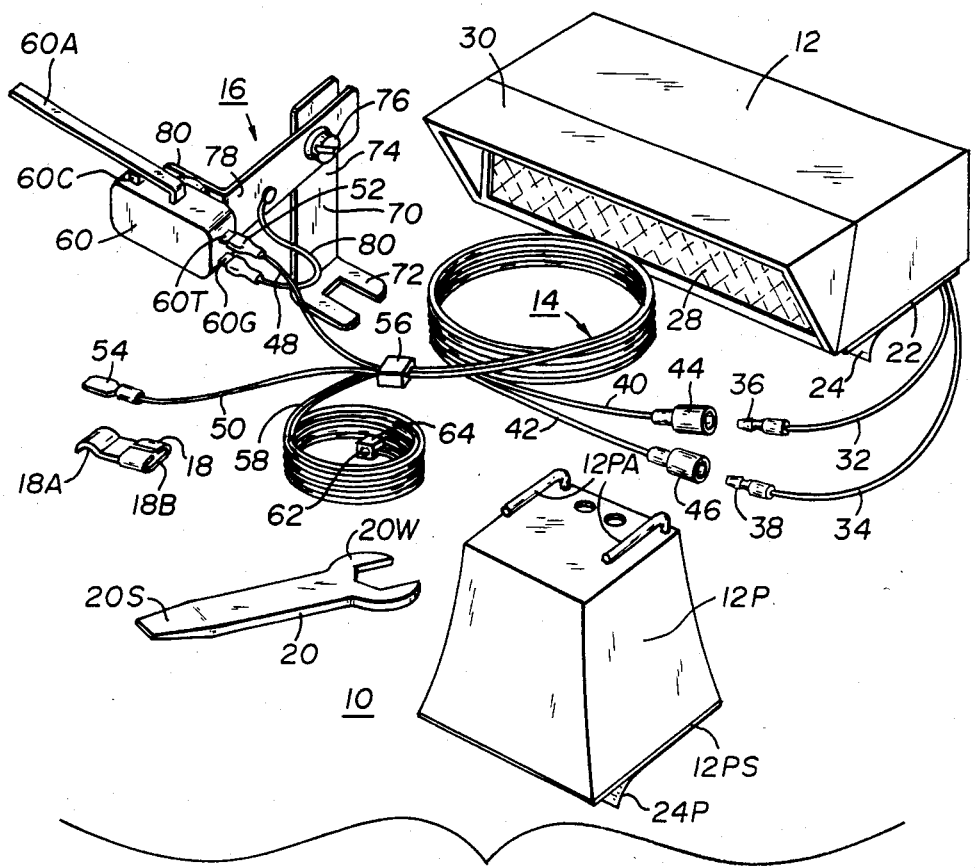
FIG. 1 is a perspective view of the parts of a kit made in accordance with the present invention.

Referring now to FIG. 1, there is depicted a kit constructed in accordance with the present invention and generally designated by the number 10. The kit 10 includes a rear deck housing 12, cable unit 14, and a switch bracket and switch unit 16, as well as an adapter 18 and an optional wrench-screwdriver tool 20.

Figure 2:
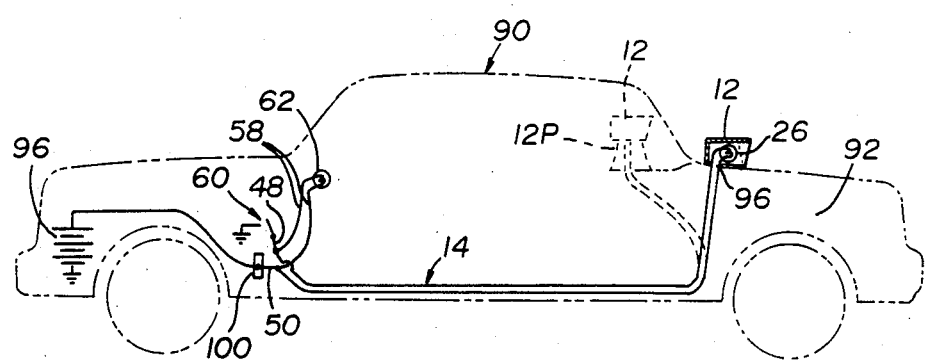
FIG. 2 is a schematic circuit diagram of the installed parts of the kit of FIG. 1 installed on a vehicle which is shown in phantom outline.

The housing 12 is preferably adapted to be self-adhering inside or outside to the rear deck of a standard passenger vehicle, as shown in solid lines in FIG. 2, by having affixed at its bottom surface double-sided adhesive foam layer 22. This adhesive layer 22 is covered by release paper 24. The housing 12 encloses a replaceable electric bulb 26 (FIG. 2) and its socket. The bulb 26, when lit, causes light to pass through an amber lens 28 (FIG. 1) which is preferably hooded by a visor 30. The bulb 26 and its socket are connected to a pair of insulation covered wires 32 and 34, which project from holes in the bottom of the housing 12 and terminate in electrical couplings 36, 38.

The housing 22 may also be mounted on the inside of the rear window (as shown in dashed outlining in FIG. 2) on an optional pedestal 12P which preferably has a self-adhering bottom surface 12PS covered by release paper 24P. The pedestal 12P preferably has a pair of forward projecting arms 12PA which are adapted to be received in matching holes (not shown) in the rear surface of the housing 12. (The bottom adhesive 22 and paper 24 is so arranged and scored that only the portion over the pedestal 12P need be removed.) The pedestal 12P preferably also has openings through it for receiving the lines 32 and 24, so that they are not exposed.

The cable unit 14 comprises a double conductor cable which is split at one end into two separate insulated wire leads 40, 42, which respectively terminate in female electrical connectors 44, 46, which adapt to receive the couplings 36, 38.

The cable unit 14 double lead portion is at least long enough to run from the accelerator pedal area of a passenger car into the trunk, via any convenient path, such as under the dash, beneath the door threshold panel(s), under the carpeting, beneath the rear seat. At its other end, it is also split into two separate insulated wire leads 48 and 50. The lead 48 is relatively short and terminates with a female contact number 52 which is shown connected to one of the two conventional male contacts of a microswitch 60, which forms part of the unit 16. The other lead 50 is preferably longer and is terminated in a male electrical blade contact 54 which is sized and shaped to be received into the fuse box which is currently in use on such General Motors cars as the 1985 Chevrolet. It is known that the fuse box known as the "glass fuse terminal" was replaced, by 90% of the auto manufacturers, with the wedge or ACT fuse terminal, about the year of 1980 and on. With such fuse boxes, the blade member 54 may be simply pushed into the fuse box to establish a good and secure connection. The blade member 54 is preferably approximately one thirty-second of an inch thick, one-quarter of an inch wide, and three-eighths of an inch long, and made up of conductive metal.

For some fuse boxes (glass fuse terminal), for example, those used prior to 1980, this connection 54 is not easily secured. For these fuse boxes, the optional adapter unit 18 must be employed. When so used, the blade number 54 is pushed into the base 18B of adapter 18, and then the blade 18A of the adapter may be secured into that glass type of fuse box. The adapter 18 has a curved section adapted to be seated between the glass fuse metal end and the fuse box's receiving socket for that end.

The twin leads of the cable unit 14 are each tapped into at an insulating block 56 and a twin lead flat or ribbon cable 58 leads out from this block 56. At the end of the ribbon cable 58 is an encapsulated miniature lamp 62 (such as ones used as miniature "Italian" Christmas tree lights) encased in a small insulating block 64 as will be explained in more detail below.

As shown in FIG. 1, the unit 16 comprises a first bracket member or standard 70 that includes a bolt receiving base 72 and an upstanding portion 74. A single locking screw 76, through a hole in the portion 74 is secured a second extension member 78 which includes a section 80 bent at a right angle to the main part of the member 78. The switch unit 60 is secured by a single screw and nut 82 (shown in FIG. 3) to this section 80. By loosening the screw 76, the member 78 may be pivoted about the screw 76, and by loosening the nut 82, the switch 60 may be pivoted on the on the section 80.

The microswitch 60 has an extending arm 60A which is normally spring-based away from a contact 60C which when depressed makes contact to complete the circuit between its terminals 60T and 60G. The contact 60G is permanently connected to a flexible lead 80 which is in turn electrically connected by soldering or other suitable means to the member 78. This lead 80 is preferably long enough to allow the switch to be rotated about one-half of a turn. (The lead 80 or preferably, and as shown, the outside of the contact number 52 should be covered with an insulating material to prevent short circuiting of the switch by the lead 80.)

The tool 20 includes a wrench end 20W and screwdriver end 20S which are sized respectively to fit the nut 82 and screw 72 so that it can be used to install the kit.

As best shown in FIG. 2, the kit is installed in a standard passenger car 90 by running the end of the cable unit 14 which includes the connectors 44, 45 from the area of the accelerator pedal through the body of the vehicle 90 and into the interior of the trunk 92. This can be done in any number of ways, and the length of the cable unit 14 is long enough to accommodate these various paths. A length of sixteen feet has been found to be a good length for this purpose. As mentioned above, the cable 14 may go under the floor carpeting, or under the removable threshold covers provided in General Motors cars. It can also be run in the channel used by the factory-installed wiring harness (although that is often difficult to do). In most cases, the cable unit 14 can enter the trunk through existing openings behind the rear seat of the vehicle 90, but in some cases, it may be necessary to punch a small hole in the trunk lining. (This lining is usually cardboard-like sheeting, and such a hole can be easily made if necessary or convenient.)

Although not shown for ease of depicting and explaining the operation, it should be understood that the voltage source 96 is preferably one that is supplied only when the automobile ignition switch is closed and one that is properly fused. Such sources are commonly available at the fuse box 100.

As will be explained below in connection with FIG. 3, the switch 60 is secured to be operated and have one side connected to chassis ground; the lead 50 secured to the fuse box 100 (and, thus, as indicated in FIG. 2, to a source of voltage indicated at 96); and the lamp 62 is positioned to be viewed by the driver. As can be appreciated best from FIG. 2, closure of the switch 60 completes a circuit, through the source of voltage 96, the fuse box 100, one conductor of the cable 14 through the bulb 26, the other conductor of the cable 14 and the switch 60 to chassis ground. This lights the bulb 26, which of course shines amber light from the lens 12, to be seen by any following driver.

Closure of the switch 60 also completes a circuit from source 96, fuse box 100, line 50, line 60, one conductor of cable 58 through miniature bulb 62, the other conductor of cable 58 and switch 60 to chassis ground. Thus, lamp 62 is lighted at the same time as the rear amber light.

This light serves as an "awareness light", being installed on the dashboard area for convenient viewing by the driver and has a bulb with a very low candle power. This light being connected to the switch unit, activation would coincide with the rear warning light at the rear of the car.

The purpose of the awareness light is to help the driver to be aware of when the rear warning light is on or off. The advantage to this information would enable the driver to better use the rear light and maximize its function under traffic conditions such as slowing, turning, and pre-braking. With the awareness light in plain view, but not in a distractive area, the driver will know how much lead time will enable the following driver to be aware of the intention to brake. Learning to use this lead time can be an asset to the crucial reaction time and braking distance.

Referring now to FIG. 3, the method of installing and adjusting the bracket and switch unit 16 will now be discussed. The present invention is of special utility in retrofitting a deceleration warning light to General Motors cars and other cars that have an accelerator pedal 98 that moves a linkage 99 which is pivoted from a bracket 102. Such brackets 102 are secured by means of three bolts 103 having bolt heads with a span of about three-eighths inch; that is, the same span as that of the wrench 20W of the tool 20 provided with the kit 10.

Thus, the first step in securing the unit 16 is to loosen one of the bolts 103, preferably the one shown in FIG. 3, slip the member 72 under it, and, after positioning the unit 76 so that the pivotal axis formed by the screw 76 is approximately parallel to that of the linkage 99, to retighten the bolt 103.

The next step is to loosen the screw 76 using the blade 20S of the tool 20 and pivot the member 78 so that the member 60A of the switch 60 is closed by the linkage 99, when the pedal 98 is not depressed but is opened when the pedal 98 is depressed. To this end, if necessary, the nut 82 may be loosened and retightened (using wrench 20W of tool 20) to position the switch 60 in the best position for this end.

To secure the wires 48, 50, and cable 14 out of the way, the block 56 is preferably provided with two-sided adhesive on one side. This adhesive is preferably covered by release paper. Thus, the blade 56 can be easily secured to any desired position under the dash.

Once the switch unit 16 is secured as discussed above, the connector 52 may be inserted and the blade 54 inserted in the fuse box 100.

At this point, the system is operational, and with the ignition "on", it can be tested by depressing the pedal 98. This should light the bulbs 62 and 26, and they should then be extinguished as the pedal is depressed. If the system is operating properly, the installer may run the flat ribbon cable under the dash and secure it in place as shown in FIG. 4.

To aid in its installation and as best shown in FIG. 5, the block 64 and ribbon cable 58 are provided with self-adhering adhesive 59 at one side. The adhesive 59 is covered by release paper 65. When the installer has selected his location for the block 64 and cable 62, he need only strip off the paper and press the block and ribbon cable in place.

For purposes of illustration and not for limitation the following values and identification are submitted. As will be appreciated by those in this art, many other makes and specific units may be employed, and the inventor himself may well decide in the future to vary from these as economics of manufacturing dictate or experience indicates. However, at the present time, these are preferred:

| | |
|---|---|
| Switch 60 | Model No. V3L-2425-D8 Made by Microswitch, Honeywell Division |
| Cable 14 | #20 gauge wire Made By J T & T Production Corp. |
| Member 70 | 2½ × ½ inches, 16 gauge thick steel sheet metal |
| Member 78 | 2½ × ½ inches, 16 gauge thick steel sheet metal |
| Bulb 62 | No. 53 Made By General Electric |
| Bulb 26 | No. T1893 Made By General Electric |
| Adhesive Layer 22 | Made By 3M Corp. |
| Blocks 56, 64 | Insulating Epoxy Encasements |
| Adapter 18 | 0.250 Fuse tap/clip Model No. 1212H Made by J T & T Production Corp. |

It should now be appreciated that a novel kit for retrofitting an automobile has been devised that is easy to install without the need for modifications under the hood and has other advantages over prior such systems.

While two particular embodiments of the invention have been shown and described, it will be obvious to those skilled in the art that changes and modifications may be made without departing from the invention, and, therefore, the aim in the appended claims is to cover all such changes and modifications as fall within the true spirit and scope of the invention.

I claim:

1. A method of retrofitting in a conventional automobile of the type that has a driver-operated accelerator pedal which pivots from a bracket and has a fuse box in the general area of the accelerator pedal and also has a rear deck, with a deceleration warning light, using a kit which includes a lamp housing and electric light bulb unit equipped with an amber lens, said housing being adapted for mounting at the rear of the automobile so that the light bulb could, when energized, emit light through the lens to be seen as an amber warning light, said bulb being energized by the application of electric power between electric leads from said housing; a length of insulated cable of sufficient length to run a circuitous path between the area of the accelerator pedal to the area of the lamp housing through the body of the automobile, said cable having means for manual attachment to at least one of the electric leads of said housing; a switch-bracket unit including a bracket for mounting to the pedal bracket and a switch mounted on the switch bracket and having an activator arm, said switch and switch bracket being so arranged that they may be positioned and adjusted near the automobile accelerator pedal so as to have the switch be activated upon release of the driver's foot from the accelerator pedal; said switch having means for receiving an electrical connection from said electrical cable, and said cable including means for connecting said electrical cable to the fuse box of the automobile, said bracket-switch unit comprising a standard member having a base with a bolt receiving opening for fitting under and being secured in place by one of the bolts of said pedal bracket, said standard member having a standard section projecting at approximately a right angle to said base, a second member attached to the standard section of said standard member in such a manner as to be pivotably displaceable thereon and secured in any one of a range of pivotable positions relative thereto, said switch unit being secured to said second member, including the steps of:

securing with the base of said standard member in one of the bolts of the accelerator bracket so that the pivotal axis between said second member and said standard member is approximately paralleled to the pivotal axis of the accelerator linkage, and adjusting the pivotal displacement of said second member so that switch arm is contacted and operated by said linkage when in its position corresponding to an undepressed accelerator and is not contacted and is not operated by said linkage when in positions corresponding to a depressed accelerator.

2. The method of claim 1 wherein the following steps are also taken:

mounting the housing at the rear of the automobile so that the light bulb could, when energized, emit light through the lens to be seen as an amber warning light;

running the length insulated cable between the area of the accelerator pedal through the body of the automobile to the housing and attaching the means to at least one of the electric leads of said housing; and attaching the other ends of said insulated cable to said switch unit.

* * * * *